Patented June 28, 1932

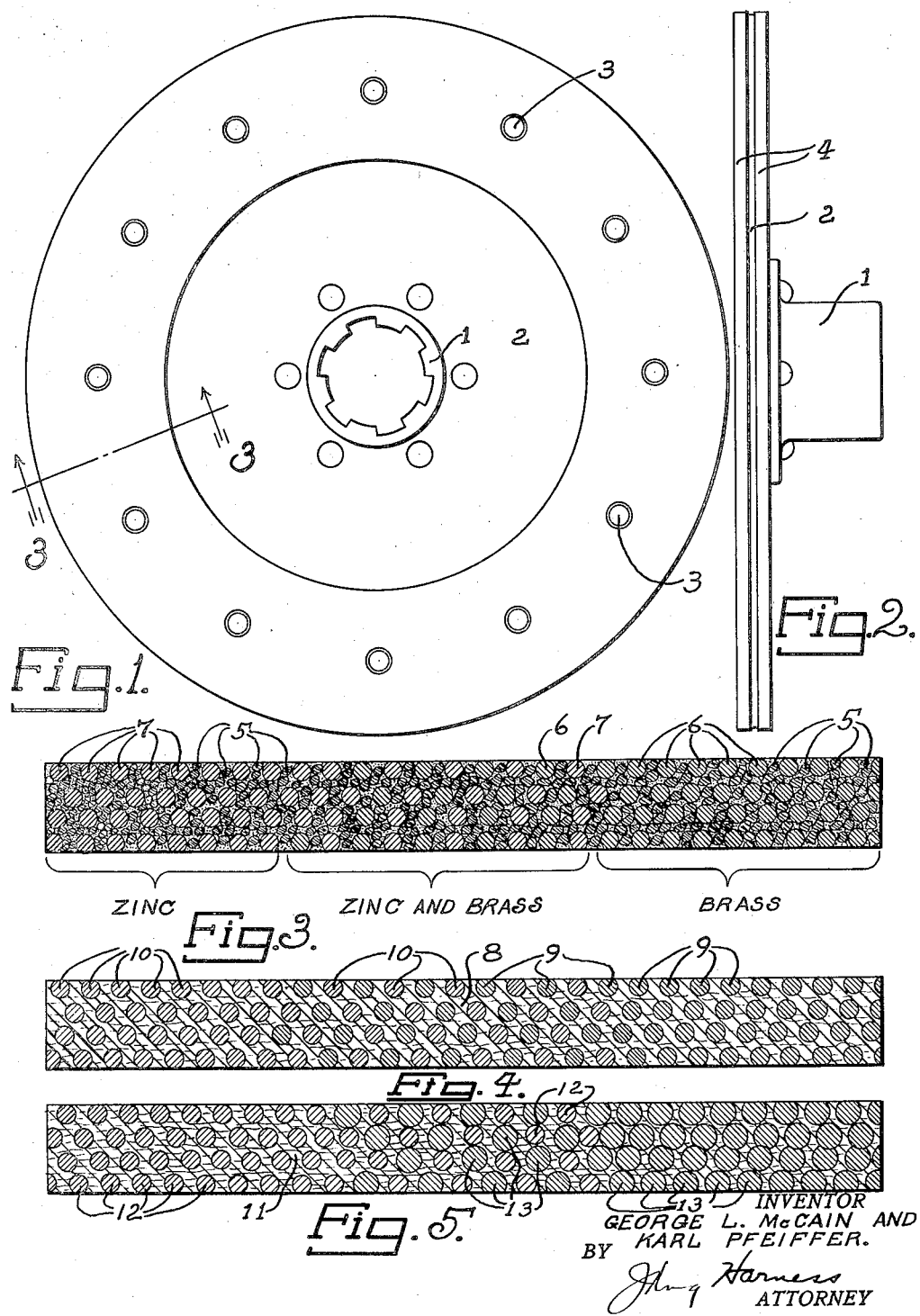

1,865,327

UNITED STATES PATENT OFFICE

GEORGE L. McCAIN AND KARL PFEIFFER, OF DETROIT, MICHIGAN

CLUTCH DISK

Application filed January 2, 1931. Serial No. 506,049.

This invention relates to improvements in the frictional members of a clutch, particularly of the type used in motor vehicles.

Heretofore, in clutches of this kind, disks having uniform frictional side surfaces at their inner and outer diameters have chattered excessively in operation and have failed untimely. These disadvantages are attributed to the differences in driving effects at the various diameters of the disks caused by the respective distances of the parts of the frictional areas from the centers of the disks and the differences in area of the parts of the frictional surfaces at the inner and outer parts of the disks.

The main objects of this invention are to balance the driving effects between the inner and outer diameters of clutch disks so as to have all portions of the frictional surfaces transmit substantially the same driving effect regardless of their location on the disks; to provide disks in a clutch of this kind which will transmit substantially equal driving effects at its inner, intermediate and outer diameters when all parts of the disks are subjected to the same normal pressure; to provide frictional surfaces on disks of this kind which have a higher coefficient of friction at the inner diameter of the disks than at the outer peripheries thereof; and to provide frictional surfaces on clutch disks having coefficients of friction which increase gradually from the inner to the outer diameters of the disks so as to maintain the products of the coefficients of friction, circumference and normal pressure at the various diameters substantially equal.

Further objects of the invention are to provide a lining structure in which is distributed friction creating bodies, preferably comprising metals of different kinds, the metal of the bodies at the inner portions of the lining having a greater coefficient of friction than the metal of the bodies at the outer portions thereof and the zone between the inner and outer portions being provided with a mixture of both metals; and to provide a woven fabric lining structure in which the friction bodies are present in the form of interwoven strands of wire composed of the metals having the above frictional characteristics.

An illustrative embodiment of this invention is shown in the accompanying drawing, in which:

Fig. 1 is a plan view of a clutch disk showing a lining structure embodying our invention.

Fig. 2 is a side elevation of the clutch disk shown in Fig. 1.

Fig. 3 is an enlarged transverse vertical section taken on the line 3—3 of Fig. 1 showing the internal structure of a fabric clutch lining element and differentiating the metals therein of different kinds by oppositely inclined section lines.

Fig. 4 is a vertical section similar to Fig. 2 showing a modified form of our invention.

Fig. 5 is a view similar to Fig. 3 showing a still further development of the invention.

In the form shown in Figs. 1, 2 and 3, the clutch member illustrated comprises a hub 1 on which a metal disk 2 is rigidly mounted. Secured to the respectively opposite sides of the disk 2 by rivets 3 are clutch lining elements 4 in the form of rings which are concentrically located with respect to the axis of the hub. The rings 4 include a closely woven fabric structure having strands 5 between which are located metal friction creating bodies that are exposed at the outer surfaces of the lining. The metal bodies 6 located at the inner circumferential portion of the lining element preferably comprise strands of brass, ribbon or wire which are interwoven with the strands of woven material. The friction creating bodies at the outer circumferential portion of the clutch element 4 comprise wires or ribbons 7 which are formed of a metal having a lower coefficient of friction than the bodies 6 at the inner portions of the clutch element, and they are also interwoven with the strands of the clutch lining structure. In the illustration shown, the frictional bodies or strands 7 comprise zinc. At the intermediate portion of the clutch element between the inner and outer parts thereof, strands of both metals are mixed together and interwoven with the structure of the lining so as to provide a zone having frictional characteristics of greater intensity than the outer portions of the lining and of less intensity than the inner portions thereof.

The widths of the zones of different frictional characteristics at the surfaces of the clutch lining elements are preferably predetermined so as to produce the same driving effect at all portions of the area of the frictional surfaces of the disk when the entire frictional surface is forced against a driving member with a substantially uniform normal pressure. By providing clutch lining elements having the proper coefficients of friction, it is possible to obtain a clutch structure in which the product of the circumference and coefficient of friction at all diameters, and the pressure is substantially equal. In order to do this, it is necessary to vary the concentration of the two metals at the intermediate zone of the clutch element so as to gradually decrease the coefficient of friction of the surface of the element from the outer boundary of the inner zone of high frictional coefficient to the inner boundary of the outer zone of low frictional characteristics.

In the form shown in Fig. 4, a clutch lining which is composed of a mixture of moldable material 8, other than fabric such as a rubber or asphalt composition, is provided with strands of metal or other friction creating bodies composed of metal or any suitable substance which differs in frictional properties. In the illustration shown, the friction creating bodies 9 in the inner circumferential portion of the clutch element comprise brass. The bodies 10 at the outer circumferential portion comprise zinc and a mixture of both zinc and brass bodies 9 and 10, respectively is distributed throughout the intermediate zone between the inner and outer circumferential portions of the clutch element.

In the form shown in Fig. 5, the clutch lining includes a body structure 11 similar to that shown in Fig. 4 which is provided with frictional bodies of different dimensions. These frictional bodies 12 and 13 preferably comprise metal and they are distributed so as to produce a higher coefficient at the inner portions of the clutch lining element than at the outer portions thereof, the intermediate zone having a mixture of bodies of two sizes and a corresponding coefficient of friction between the coefficients of friction of the inner and outer portions. The large friction creating bodies 13 are located at the inner portion of the lining element, and the small bodies 12 are located at the outer portion thereof. If desired, the variation in frictional characteristics resulting from the different dimensions may be solely relied upon to create the desired variation in the frictional properties of the surface of the disk, or metals of different kinds may be used for this purpose.

Although but several specific embodiments of this invention have herein been shown and described, it will be understood that various changes in the size, shape and arrangement of parts may be made without departing from the spirit of our invention and it is not our intention to limit its scope other than by the terms of the appended claims.

What we claim is:

1. A clutch disk including a lining structure, friction creating bodies distributed throughout said lining structure, the coefficient of friction of the bodies at the inner parts of said lining being greater than the coefficient of friction of the bodies at the outer portions thereof.

2. A clutch disk including a lining structure, metal friction creating bodies distributed through said lining structure, the aggregate frictional effect of the bodies at the inner parts of said lining structure being substantially equal to the aggregate frictional effects of the bodies at the outer portions of said lining.

3. A clutch disk including a lining structure, friction creating bodies distributed throughout the inner and outer portions of said lining structure comprising respectively different metals, the metal of the bodies at the inner part of said lining structure having a greater coefficient of friction than the metal of the bodies at the outer portions thereof.

4. A clutch disk including a lining structure, friction creating bodies distributed throughout said lining structure, the coefficient of friction of the bodies at the inner parts of said lining being greater than the coefficient of friction of the bodies at the outer portions thereof, and the zone between said inner and outer portions having a mixture of bodies of both coefficients of friction.

5. A clutch disk including a lining structure, frictional creating bodies distributed throughout the inner and outer portions of said lining structure comprising respectively different metals, the metal of the bodies at the inner part of said lining structure having a greater coefficient of friction than the metal of the bodies at the outer portions thereof, and a mixture of bodies of both metals between said inner and outer portions.

6. A frictional disk including a lining structure, frictional bodies mainly comprising zinc distributed throughout the outer portions of said lining, frictional bodies mainly comprising brass distributed throughout the inner portions of said lining, and a mixture of frictional bodies of zinc and brass respectively distributed throughout the zone between said inner and outer portions.

7. A fabric clutch disk lining element having friction creating bodies distributed throughout its entirety, the coefficient of friction of the bodies at the inner parts of said lining being greater than the coefficient of friction of the bodies at the outer portions thereof.

8. In a fabric clutch disk lining element a plurality of strands of different friction creating materials at the inner and outer portions of said lining respectively, the friction creating material of the inner portions of said lining having a greater coefficient of friction than that at the outer portions of said lining.

9. A clutch disk including a fabric lining, strands of metal in the inner and outer portions of said lining respectively, the strands of the inner portion including metal having a greater coefficient of friction than the metal of the strands of the outer portions of said lining.

10. A clutch disk including a fabric lining, strands of metal in the inner and outer portions of said lining respectively, the strands of the inner portion including metal having a greater coefficient of friction than the metal of the strands of the outer portions of said lining, and a mixture of strands of both said metals in the intermediate portions of said lining.

11. A clutch disk including a fabric lining, strands of brass in the inner portions of said lining, strands of zinc in the outer portions thereof and both brass and zinc strands intermingled in the zone of said lining between the outer and inner portions thereof.

12. A clutch disk including a lining structure, friction creating bodies distributed throughout said lining structure, the bodies at the inner portions of said lining structure being of larger dimension than the bodies at the outer portions of said structure.

GEORGE L. McCAIN.
KARL PFEIFFER.